United States Patent [19]

Brille

[11] Patent Number: 4,565,103
[45] Date of Patent: Jan. 21, 1986

[54] CONNECTING ROD BEARINGS FOR A VOLUMETRIC PISTON CHAMBER MACHINE

[76] Inventor: Maurice Brille, 27 rue Parmentier, Nanterre, Hauts de Seine, France

[21] Appl. No.: 376,349

[22] Filed: May 10, 1982

[30] Foreign Application Priority Data

May 11, 1981 [FR] France ............................ 8109801

[51] Int. Cl.$^4$ ............................................. F16H 23/00
[52] U.S. Cl. ................................................. 74/60
[58] Field of Search .................. 74/60, 839; 123/58 B, 123/58 BA, 58 BC; 417/269; 91/499

[56] References Cited

U.S. PATENT DOCUMENTS

| | | | |
|---|---|---|---|
| 1,255,973 | 2/1918 | Almen | 74/60 |
| 1,877,285 | 9/1932 | Eckels | 417/269 X |
| 2,009,495 | 7/1935 | Holsebos | 74/60 |
| 2,028,557 | 1/1936 | Nevatt | 74/60 |
| 2,105,019 | 1/1938 | Turner | 74/60 |
| 2,229,246 | 1/1941 | Istad | 123/58 BB |
| 2,257,258 | 9/1941 | Holsebos | 74/60 |
| 2,456,164 | 12/1948 | Youhouse | 74/60 |
| 2,713,829 | 7/1955 | Beacham | 74/60 X |
| 3,180,159 | 4/1965 | Girodin | 74/60 |
| 4,235,116 | 11/1980 | Meijer et al. | 74/60 |
| 4,258,590 | 3/1981 | Meijer et al. | 74/839 |
| 4,304,173 | 12/1981 | Brille | 74/60 X |

FOREIGN PATENT DOCUMENTS

| | | | |
|---|---|---|---|
| 2351252 | 4/1975 | Fed. Rep. of Germany | 91/499 |
| 2513915 | 9/1975 | Fed. Rep. of Germany | 91/499 |
| 773552 | 11/1934 | France | 74/60 |
| 2194226 | 2/1974 | France . | |
| 2403449 | 4/1979 | France . | |
| 1006852 | 9/1963 | United Kingdom | 91/499 |
| 1033355 | 6/1966 | United Kingdom | 91/499 |

Primary Examiner—Lawrence J. Staab
Attorney, Agent, or Firm—Remy J. VanOphem

[57] ABSTRACT

The invention is a volumetric piston chamber machine wherein the crankpin is relieved of the inertia force and wherein a seat is constructed in a single piece adapted to act as a female part with the crank being a male part. As a result, the force distribution throughout this volumetric piston chamber engine is more uniformly distributed and offers the advantage of a smaller engine in the overall axial direction eliminating the harmful transverse stresses.

22 Claims, 12 Drawing Figures

CONNECTING ROD BEARINGS FOR A VOLUMETRIC PISTON CHAMBER MACHINE

BACKGROUND OF THE INVENTION

Field of the Invention

The present invention relates to a volumetric piston machine, of axial or piston-chamber type. Such a machine can be constructed in the form of a pump, an engine or a compressor with pistons.

The connecting rod bearings of a machine of this type includes an inclined plate or seat, against which the piston rods rest. The pistons are movable in bores which are parallel to one another and are distributed in a piston chamber whose central axis is the geometrical axis about which the inclined plate turns. The plate is firmly fixed to the output shaft of the machine.

Description of the Prior Art

It is well known that the connecting rod bearings of this type of machine present a problem concerning mechanical efficiency as far as its application to engines are concerned. This is where the thrust of the pistons tend to cause the output shaft to rotate.

French Pat. No. 2,194,226 describes an axial volumetric engine whose cylinders have their axes parallel, equidistant from one another and equidistant from a central axis. This machine concerns a piston chamber type of heat engine. The above mentioned problem essentially relates to the mounting of the seat and in particular to the design of its pivot, which is virtually friction-free due to the non-slip rolling of a double surface cone, firmly fixed to the seat, over a double surface cone firmly attached to the fixed angle of the engine. The rolling action without slippage is provided by two pairs of conical gears mounted on the base cones.

In French Patent Application No. 2,403,449, filed Sept. 20, 1977, the two abovementioned pairs of gears are retained, but the two pairs of corresponding adjacent smooth cones are separated into two pairs of support cones and two pairs of guide cones.

Another important feature of this known system resides in the elimination of the translatory movement of the drive shaft and of the flywheel if the seat itself undergoes a longitudinal movement as a result of the variation in the compression ratio. This is yet another characteristic feature of French Pat. No. 2,194,226.

The longitudinal independence of the seat relative to the drive shaft is achieved by seating the journal in a cylindrical or polygonal slide block having its axis parallel to the engine axis xx' and sliding in an eye of the crank. The crank, thus, no longer realizes axial displacement.

These principal prior art arrangements are summarized in FIGS. 1 and 2.

The drawings show two outer rolling support cones 12 and 19 and two inner rolling support cones 62 and 63, as well as two outer rolling guide cones 13 and 20 and two inner rolling guide cones 66 and 67.

The pairs of drive gears are not shown.

FIGS. 1 and 2 further illustrate the journal 8 of the seat, the eye of the crank 10 and the slide block 92, French Pat. No. 2,403,449 is somewhat different, in that the slide block is cylindrical and is stopped from rotating by the slide block 92 while the present figures show a square section, which is functionally equivalent. The bearing 29' on the flywheel side is stopped axially to prevent any longitudinal movement of the shaft.

In spite of the above related improvements made to the prior art machines with the objective of economical power consumption, experience and calculation have shown that certain components of the apparatus operate too vigorously, causing reduction of the machine's life. Secondly, the bulk, in respect of length, is too great for convenient installation of the engine on a vehicle.

It is the object of the present invention to overcome these disadvantages by the improvements which will now be described.

The attached drawings, given by way of a non-limiting example, will allow a better understanding of the invention.

DETAILED DESCRIPTION OF THE PREFERRED EMBODIMENT

Figure 3:
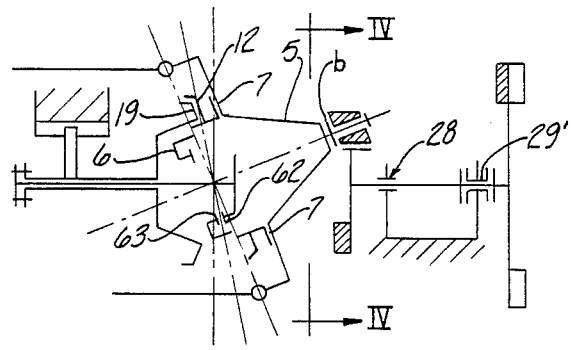
FIG. 3 is a diagrammatic view of an axial section of the engine of the present invention, illustrating the freeing of the crank pin which controls the inclined seat.
Figure 4:
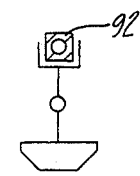
FIG. 4 is a cross-sectional along line IV—IV of FIG. 3.

The first improvement is characterized by the crankpin being freed from the inertia forces. This freeing is achieved as shown in FIGS. 3 and 4 by providing a large play or by omitting a side 91 of the square opposite the axle so that only the other sides are confined and adjusted. The axle side receives the radial component of the explosive force, offset by the inertia force, and the two lateral sides transmit the instantaneous drive torque, modulated by the seat.

In the case of low explosive charges and rapid running, where inertia is significant factor, the forces no longer act on the exterior of the crank and are received directly by the outer rolling support cones 12 and 19 which are provided to receive very large forces under much better conditions than the side black bushing 92 or the ball bearing which replaces it. However, the side block bushing 92 must be kept in place axially by two stops b. There is nothing changed in the operation of the inner rolling support cones 62 and 63 which remain in the support position, under all circumstances of load and speed.

The second improvement relates to the actual construction of the seat and of the crank 10.

Figure 1:
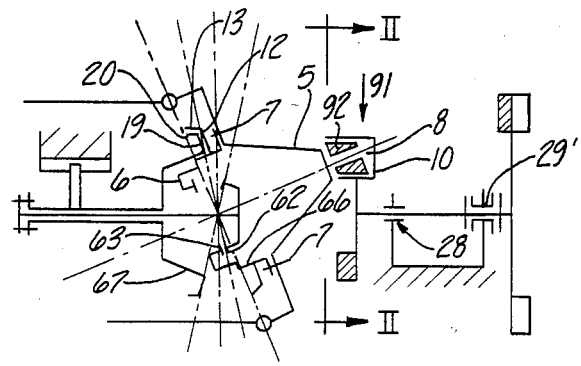
FIG. 1 is a longitudinal section of the engine.
Figure 2:
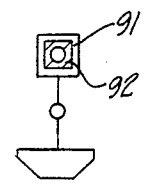
FIG. 2 is a section along line II—II of FIG. 1 taken transversely at right angles to the crank.

This seat has hitherto been constructed in two parts (FIGS. 1 and 2), with the front part 6 carrying the mobile support cone 63 together with its gearing (not shown) and the rear part 5 carrying the journal 8. The front and rear parts are joined by a circle of bolts 7. The two part assembly being necessitated by the need to mount the inner rolling support cone 62 and its gears on the axle 2. It has been found, however, that the forces developed in the seat are greatest at right angles to the assembly and are located in a plane revolving about the axis of the seat, so that the bolts 7 in turn support the maximum force and are only slightly assisted by the others. This results in troublesome dimensions in respect to the construction, and an undesirable increase in weight of the seat.

Figure 5:
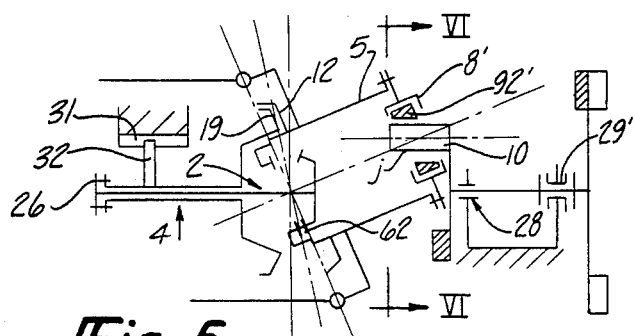
FIG. 5 is a diagrammatic view similar to FIG. 3, illustrating the one-piece construction of the oscillating seat.
Figure 6:
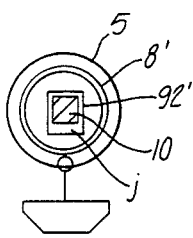
FIG. 6 is a sectional view along line VI—VI of FIG. 5.

The second improvement characterized according to the invention, thus, consists of constructing the seat in a single piece or power transmission body, with a rear opening which is sufficiently large to allow the fixed thrust inner rolling support cone 62 and its gearing to pass through it. In this configuration the journal arrangement is inverted. Accordingly, the seat becomes the female part and the crank the male part, as seen in FIGS. 5 and 6. The journal 8' is easily fixed to the rear portion of the seat 5 as the forces are much lower away from the center than at the center, and more uniformly distributed. The journal 8' is female and revolves on the slide block bushing 92', which can be a ball bearing. The slide block bushing 92' is housed in the square of the crank 10 with a large amount of play or clearance (j) on the axle side, enabling the seat to become free from the crank under the inertia force, as discussed above with respect to FIG. 3, and for the inertia forces to be received by the outer rolling support cones 12 and 19.

These improvements do not in any way affect the utilization of the aforementioned improvements, that is, the drive axle cannot undergo a translatory or longitudinal movement and is held by the thrust bearing 29', while the axles 2 and 4, joined to one another at their ends outside the engine by the bolts 26, can execute a slight translatory or longitudinal movement due to the variation in the compression ratio, and are held in rotational relationship in principle by the finger 32 sliding in the fixed groove 31. This translatory or longitudinal movement is communicated to the seat, and the corresponding movement is made possible by the sliding of the slide block bushing 92' relative to the crank 10.

In principle, the axles 2 and 4 are advantageously held in rotation, as above, by a leaf spring 38 described in French Pat. No. 2,403,449.

Figure 7:
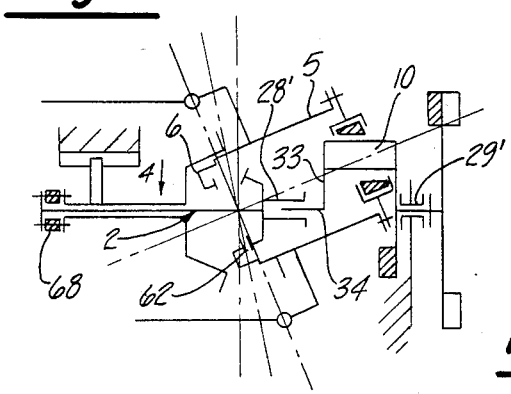
FIG. 7 is a diagrammatic view in longitudinal section, illustrating an embodiment wherein the crankshaft is carried by two bearings.

A third feature, shown in FIG. 7, now appears as a consequence of the two preceding improvements. Starting from the point where the male crank 10 has penetrated into the seat 5, it is easy to extend it with a second crank branch 33 and a journal 34 concentric with the drive shaft, revolving in a fixed thrust bearing 28' firmly attached to the fixed inner rolling support cone 62 and to the axle 2 which carries it, and concentric with these.

A single-bend crank shaft is thus produced with its two thrust bearings 28' and 29' and its journal carrier or crank 10. The thrust bearing 28 is omitted and had been replaced by the thrust bearing 28'. Consequently, the engine is considerably shorter in the axial direction, which is the direction in which its size is usually the most critical.

However, general observation of implementation of this improvement appeared to lead to an unfavourable condition, namely that the new thrust bearing 28', instead of being rigidly fixed to the framework like the thrust bearing 29', is at the end of a more or less flexible stump, that is, the part of the shaft 2 which extends beyond the axle 4 and whose length and diameter are controlled by the clearance of the front portion 6 of the seat.

However, on plotting all the forces involved as a result of this crank shaft arrangement, it has been found unexpected result has been found that, contrary to the above observation, that this arrangement produces a virtual elimination of all flexing of the stump, in spite of the very short action distance, of the forces involved, namely both the explosive forces and the inertia forces. There has also been found a considerable reduction of the forces balancing in the framework, thereby permitting generally increased stability, as well as lighter weight of the framework.

Figure 8:
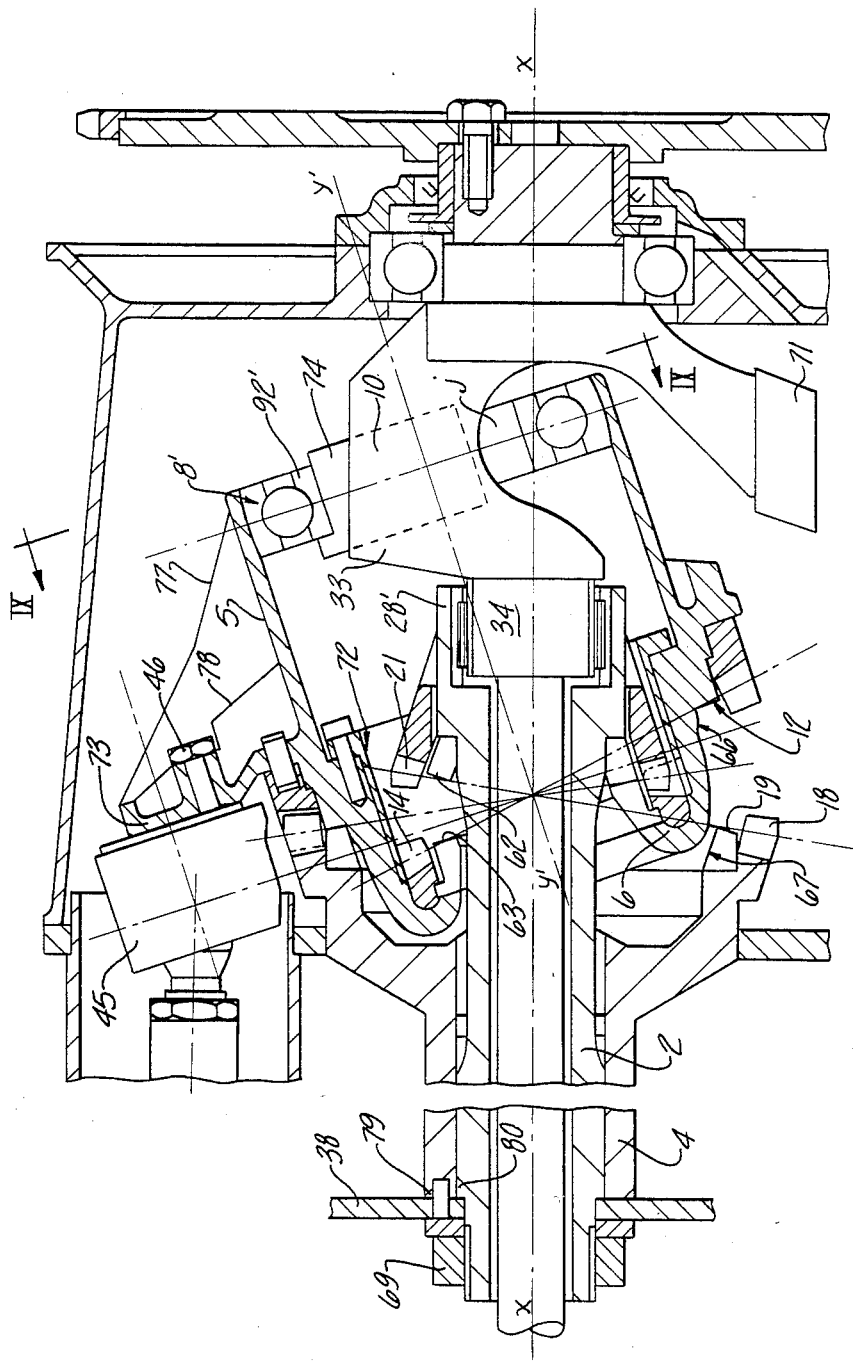
FIG. 8 is an axial section of a practical embodiment of a piston chamber engine according to the invention.

FIG. 8 shows the axle shafts 2 and 4 which are concentric with the axis of the engine and are rotationally coupled by grooves 70 and rotationally locked by the leaf spring 38. The axle shaft 4 carries the outer rolling support cone 19, the inner rolling guide cone 67 and the gearing 18; the axle shaft 2 carries the inner rolling support cone 62 and the gearing 21, and its end enlarges to form the thrust bearing 28', which in this position carries a needle bearing. In this needle bearing at the end of the crank shaft revolves the journal 34 which includes a branch 33 and the male crank 10. The branch 33 is completed by the thrust bearing 29' which forms a stop, and by the substantial counterweight 71.

Figure 9:
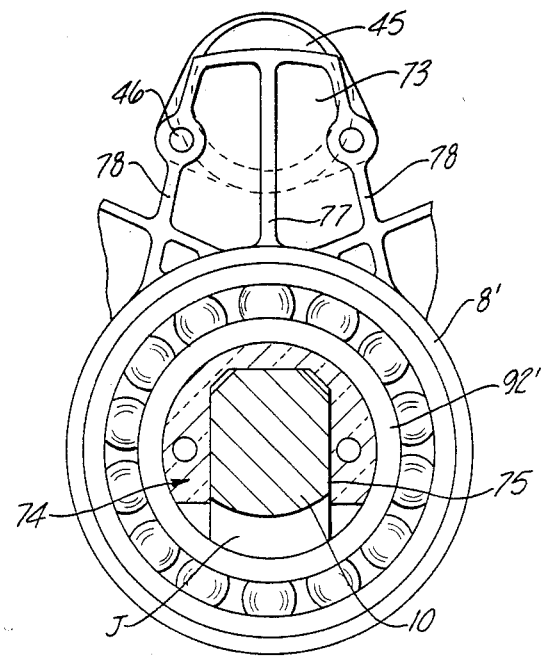
FIG. 9 is a cross-sectional view along line IX—IX of FIG. 8, taken opposite the drive journal at right angles to the axis of the seat.

The rear portion of the seat 5 is again made in a single piece, with its front portion 6 carrying the inner rolling support cone 63 and the gearing 14. The front and rear portion of the seat are kept in contact for rotation by the channelled sleeve 72. The central section of the seat is expanded into n lugs 73, n being the number of cylinders (an odd number, for 4-stroke engines), and carries the outer rolling support cone 12 and the inner rolling guide cone 66. The n lugs carry the casings for attachment of the connecting rods 45, as described in French Pat. No. 2,403,449, attached ultimately by bolts 46. In the rear portion of the seat 5, which carries the female journal 8' is mounted the slide block ball bearing 92' adjusted on the yoke 74 which straddles the "square" 10 of the crank shaft. As mentioned above, this arrangement produces a very substantial play (j) between the slide block bearing 92' and the crank shaft. This play, as well as the spherical arrangement of the slide block bearing in the seat, facilitates the assembly of the whole unit. As FIG. 9 shows, the two parallel flanks 75 of the yoke 74 are adjusted on the corresponding flanks of the crank shaft with a minimum of play, so as to insure the instantaneous transmission of the drive torque, modulated by the seat. A flat top 76 is applied under load against the crank shaft 10 except when the predominant inertia or the mixture intake travel tends to separate them and press the outer rolling support cone 12 against outer rolling support cone 19. The play at 76 thus must be minimal, and of the same order as the play of the two parallel flanks 75. The flanks 75 flat top allows the rear portion of the seat 5 to move along the xx' axis during variation in the compression ratio, while the crank shaft does not move along this axis. The same is true, under these circumstances, of the bearing 28' and the journal 34, and it is for this reason that the corresponding bearing is a needle bearing.

FIG. 9 also shows the structural ribs which stiffen the n lugs 73 relative to the rear portion of the seat 5 and wherein each lug includes, a central rib 77 principally utilized to transmit the radial explosive force, and two lateral ribs 74 which play a part in the general stiffening of the n lugs 73 and in the transmission of the torque.

The concentric extension of the crank shaft, through the shaft 2, is utilized for the purpose of controlling the distributor and the auxiliaries.

Finally, it should understood that the abovementioned play at 76 can be eliminated and replaced by a slight initial pre-stress, through careful choosing of the non-alignment of the front end 79 of the shaft 4 and of the step 80 of the shaft 2, before tightening the bolt 69. To achieve this, all the support cones must be slightly "boat-shaped". The possibility of providing this pre-stress can also be seen in FIG. 7, by selecting the appropriate thickness of the wedge 68. This solution has already been touched on in French Pat. No. 2,194,226, but incorrectly carried through as a result of the possibility of an angular staggering between the shafts 2 and 4, which must not happen.

Figure 10:
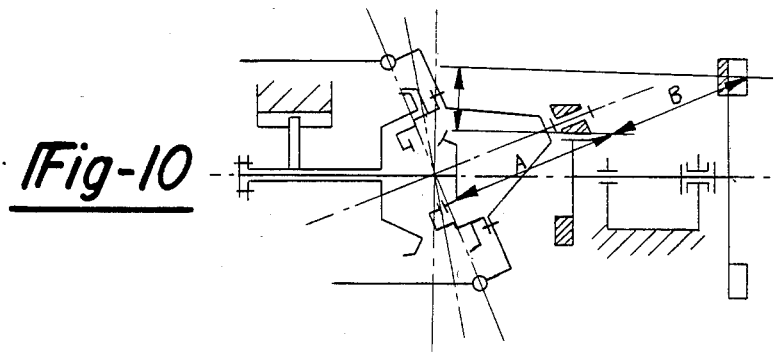
FIG. 10 is a diagrammatic view of an axial section of the engine showing only the distribution of forces.
Figure 11:
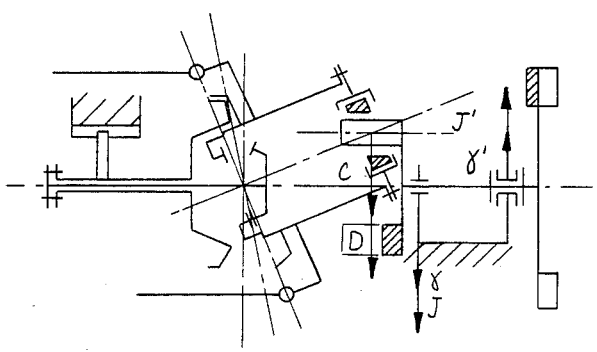
FIG. 11 is a diagrammatic view of an axial section of the engine similar to FIG. 5 showing only the distribution of forces.
Figure 12:
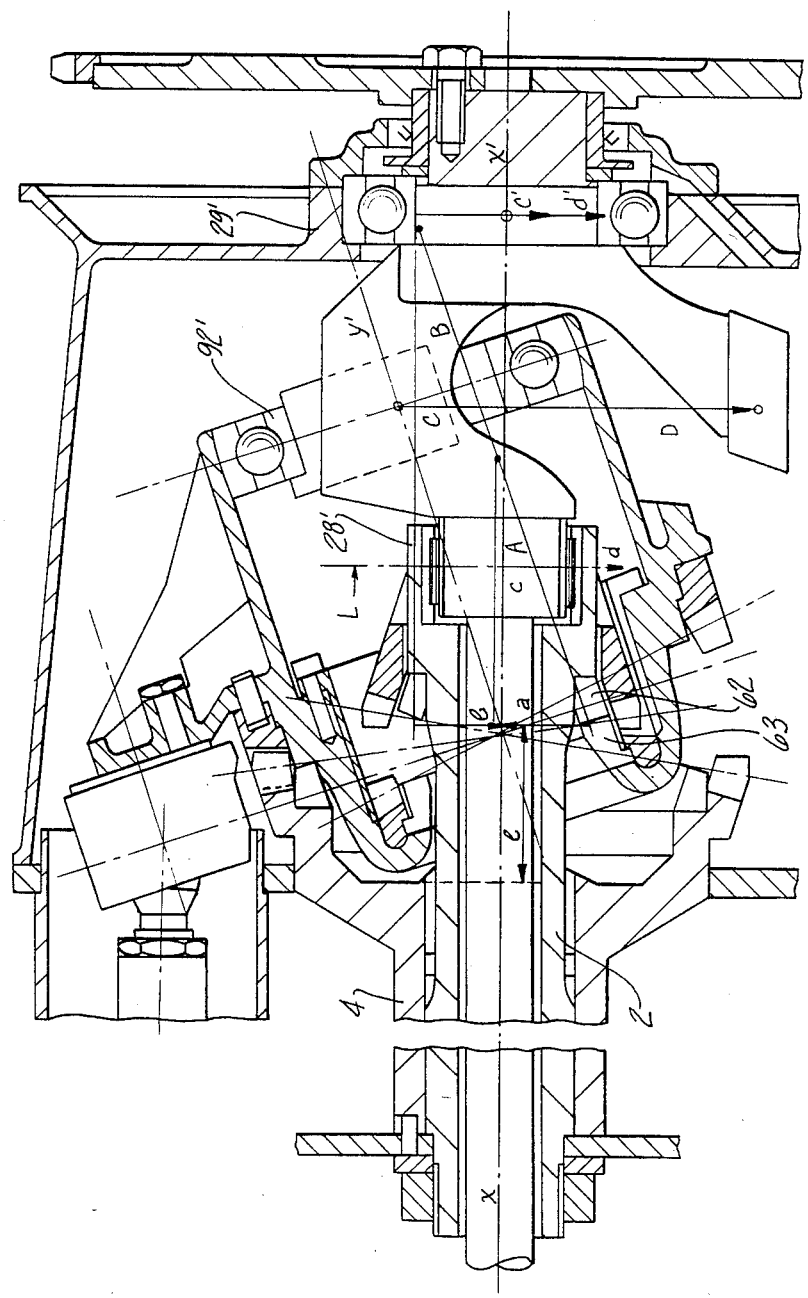
FIG. 12 is an axial section of a practical embodiment of a piston chamber engine according to the invention similar to FIG. 8 and showing the distribution of forces.

With reference to FIGS. 10 through 12, the principal forces within the engine may now be identified as well as the advantages of the configuration illustrated in FIGS. 7 and 8.

The calculations show that in all cases illustrated of the engine shown in FIGS. 3 to 8, the greatest force of the engine is that which presses the inner rolling support cones 62 and 63 against one another.

This force, parallel to the axis yy' of the seat, is the sum of two forces A and B.

A is proportional to the thrust of the explosion at the upper dead center of the piston.

B is proportional to the inertia forces acting on the seat and on its movable elements.

A breaks down into a radial force a and an axial force. The axial force is of no concern, because it merely exerts a traction on the axle shaft 2, whose cross-section is chosen accordingly, and this traction does not generate vibrations.

On the other hand, the radial force a exerts a flexing action on this same axle shaft 2, in the part extending beyond the axle shaft 4, with an axial moment al, and since it varies in intensity and in position (because it revolves), it can reduce vibrations in the stump, which require special precautions.

Equally, B breaks down into a radial force b and an axial force which (as in the case of A) is not troublesome. The radial force b acts, like a, on the shaft 2, exerting a moment bxl, so that the stump of the axle shaft 2 extending beyond the axle shaft 4 is subjected to a total moment of:

$$+M = al + bl \text{ or } l(a+b)$$

(trigonometric direction = +)

(see FIGS. 3, 4 and 8). The same is true of FIGS. 5 and 6, even though not shown.

In every case in FIGS. 3 to 8, a radial force c acting towards the drive axle is applied, by the bushing 92', on the crank or on the crank shaft. This force, which is always much less than the force A, depends principally on the thrust of the explosion but is reduced, and even cancelled, above a certain speed, by the inertia of the seat.

Equally, an inertia force D is induced by the counterweight of the crank or of the crank shaft. It depends on the square of the speed and remains proportional to the force B, though much less than the latter.

In the configurations of FIGS. 3 to 6, the force C breaks down into 8 on the thrust bearing 28 and 8' on the thrust bearing 29'as shown in FIG. 11. Equally, the force D breaks down respectively into 5 on bearing 28 and 5' on bearing 29'.

In conclusion, the configurations of FIGS. 3 to 6 reflect two systems of forces which act independent of one another on contiguous components, and which only constitute a closed system in relation to the external frameworks. On the other hand, in the configurations of FIGS. 7 and 8, the situation is different because the forces C and D, as applied to the bearings 28' and 29', respectively, give forces e and d on the bearing 28' at the end of the shaft 2, and forces c' and d' on the bearing 29', which is the only one remaining within the framework of the engine.

With reference to FIG. 12, it can be seen that these forces c and d induce, in the shaft 2, a moment:

$$-M' = -cL - cL \text{ or } -L(c+d)$$

(trigonometric direction = +), which is always opposed to the moment M at any instant of the rotation of the engine.

The ideal would be if $M - M' = 0$.

It is already possible to achieve exactly that $bl = dl = 0$, since force b and force d remain proportional at all speeds (the factor w2 being the same, $d = Kb$, with $K < 1$ and about ½), and there is a certain design latitude in the choice of l and L, the ratio of which is moreover of course about ½.

It is not possible, in all cases, to cancel $al - cL$, because c does not remain proportional to a; however they will cancel for a certain speed w. In that case $M - M' = 0$.

However, it is possible to approach this condition over a rather wide range of speeds. Moreover, there will also be a reaction from the forces due to the drive torque resulting from the action of the other cylinders on the seat, which cylinders will introduce forces at right angles to the plane of the figure and act both on the bearing 28' and on the gearing of the inner rolling support cone 21. These forces are opposed and are subtractive in respect of the flexing of the stump of the axle shaft 2.

A certain residual amount of the flexural moment due to these forces, though less than the forces of type a, b, c and d, makes it superfluous to seek the total cancellation corresponding to $M - M' = 0$.

It is obvious that the very great reduction in the flexural moment of the shaft stump 2, in the configuration of FIGS. 7 and 8, assists the stability of this shaft.

Moreover, the reactions c' and d' of the crank shaft on the rear bearing represent a small fraction of the reactions (perhaps ⅓) absorbed by the bearings of the framework in the configurations of FIGS. 3 to 6.

Having described the invention, what is claimed is:

1. A power transmission device for converting reciprocating motion of a plurality of connecting rods each reciprocably disposed within a housing with its respective reciprocation axis parallel to a common central axis and spaced a predetermined distance from said central axis, said plurality of connecting rods reciprocating in a predetermined sequential order about said central axis, said power transmission device comprising:

a power transmission body disposed adjacent to said plurality of connecting rods and pivotally interconnected with each of said plurality of connecting rods such as to wobble about said central axis as said plurality of connecting rods sequentially reciprocate;

a central passageway through said power transmission body, said central passageway having a first portion defining a first opening and a second portion defining a second opening opposite said first opening;

axle shaft means mounted to said housing about said central axis, said axle shaft means having a portion extending through said first opening in said power transmission body;

first outer gear means fixedly disposed on an outer portion of said power transmission body;

second outer gear means interconnected with said axle shaft means, said second outer gear means engaging a portion of said first outer gear means such that said first outer gear means is rotated about said central axis as said power transmission body is wobbled therearound;

first inner gear means fixedly disposed within said first opening of said central passageway and said power transmission body;

second inner gear means disposed within said central passageway of said power transmission body adjacent said first inner gear means and interconnected with said extending portion of said axle shaft means, said second inner gear means engaging a portion of said first inner gear means diametrically opposed to the engaged portions of said first and second outer gear means such that said first inner gear means is rotated about said central axis as said power transmission body is wobbled therearound;

crank means having a first end with a first journal portion rotatably mounted to said housing, said first journal portion having a central axis coaxial with said central axis of said power transmission device, a second end terminating in a second journal portion, said second journal portion having a central axis coaxial with said central axis and further being mounted within said power transmission body between said first and second opening, said second journal portion further being rotatably interconnected with said extending portion of said axle shaft means extending through said first opening in said power transmission body such as to rotate about said central axis, an intermediate portion disposed between said first and second journal portions;

said intermediate portion comprising yoke means fitted thereto, said yoke means constraining said intermediate portion for motion relative to said intermediate portion to permit longitudinal motion of said intermediate portion relative to said yoke means and to permit radial motion of said intermediate portion towards and away from said central axis, said yoke means being rotatably mounted to said power transmission body thereby minimizing the load transmitted between said power transmission body and said crank means; and means for mounting said first journal portion, second journal portion and said intermediate portion respectively to said housing, axle shaft means and power transmission body.

2. The power transmission device of claim 1 wherein said power transmission body comprises a unitary element having a hollow cylindrical main portion and a plurality of radial extensions extending from said main portion, each of said radial extensions being interconnected with one of said plurality of connecting rods.

3. The power transmission device of claim 2 further comprising:

first outer conical guide means fixedly disposed on an outer portion of said power transmission body adjacent said first outer gear means;

second outer conical guide means fixedly disposed on said axle shaft means adjacent said second outer gear means and cooperating with said first outer conical guide means to guide the wobbling motion of said power transmission body;

first inner conical guide means fixedly disposed within said central passageway of said power transmission body adjacent said first inner gear means; and second inner conical guide means fixedly disposed on said axle shaft means adjacent said second inner gear means and cooperating with said first inner conical guide means to guide the wobbling motion of said power transmission body.

4. The power transmission device of claim 1 wherein said central passageway comprises a longitudinal bore through said power transmission body.

5. The power transmission device of claim 1 wherein said axle shaft means comprises:

an inner axle shaft comprising said portion of said axle shaft means and said second inner gear means; and an outer axle shaft comprising said second outer gear means and mounted coaxially with said inner axle shaft and constrained to move therewith.

6. The power transmission device of claim 1 wherein each of said gear means comprises a conical gear.

7. The power transmission device of claim 1 further comprising counterweight fixedly secured to said crank means such as to counterbalance the power transmission body as said power transmission body and said crank means rotate about said central axis.

8. The power transmission device of claim 1 wherein the power transmission body comprises a unitary element having a hollow cylindrical main portion and a plurality of radial extensions extending from said main portion, each of said radial extensions being interconnected with one of said plurality of connecting rods.

9. The power transmission device of claim 8 wherein said central passageway comprises a longitudinal bore through said power transmission body.

10. The power transmission device of claim 1 wherein said axle shaft means comprises:

an inner shaft comprising said portion of said axle shaft means and said second inner gear means; and an outer axle shaft comprising said second outer gear means and mounted coaxially with said inner axle shaft and constrained to move therewith.

11. A power transmission device for converting reciprocating motion of a plurality of connecting rods each reciprocally disposed within a housing with its respective reciprocation axis parallel to a common central axis and spaced a predetermined distance from said central axis, said plurality of connecting rods reciprocating in a predetermined sequential order about said central axis, said power transmission device comprising:

- a power transmission body disposed adjacent said plurality of connecting rods and pivotally interconnected with each of said plurality of connecting rods such as to wobble about said central axis as said plurality of connecting rods sequentially reciprocate, said power transmission body comprising a unitary element having a hollow cylindrical main portion and a plurality of radial extensions extending from said main portion, each of said radial extensions being interconnected with one of said plurality of connecting rods;
- a central passageway through said powr transmission body, said central passageway having a first portion defining a first opening and a second portion defining a second opening opposite said first opening;
- an inner axle shaft mounted to said housing about said central axis, said inner axle shaft having a portion extending through said first opening in said power transmission body;
- an outer axle shaft mounted to said housing coaxial with said inner axle shaft and constrained to move therewith;
- first outer gear means fixedly disposed on an outer portion of said power transmission body;
- second outer gear means interconnected with said outer axle shaft, said second outer gear means engaging a portion of said first outer gear means such that said first outer gear means is rotated about said central axis as said power transmission body is wobbled therearound;
- first inner gear means fixedly disposed within said first opening of said central passageway and said power transmission body;
- second inner gear means disposed within said central passageway of said power transmission body adjacent said first inner gear means and interconnected with said extending portion of said inner axle shaft, said second inner gear means engaging a portion of said first inner gear means such that said first inner gear means is rotated about said central axis as said power transmission body is wobbled therearound;
- first outer conical guide means fixedly disposed on an outer portion of said power transmission body adjacent said first outer gear means;
- second outer conical guide means fixedly disposed on said outer axle shaft adjacent said second outer gear means and cooperating with said first outer conical guide means to guide the wobbling motion of said power transmission body;
- first inner conical guide means fixedly disposed within said central passageway of said power transmission body adjacent said first inner gear means;
- second inner conical guide means fixedly disposed on said inner axle shaft adjacent said second inner gear means and cooperating with said first inner conical guide means to guide the wobbling motion of said powr transmission body;
- yoke means rotatably interconnected with said second portion of said power transmission body such that said yoke means moves in a circular orbital path about said central axis as said power transmission body is wobbled thereabout;
- crank means having a first end with a first journal portion rotatably mounted to said housing, said first journal portion having a central axis coaxial with said central axis of said power transmission device, a second end terminating in a second journal portion, said second journal portion having a central axis coaxial with said central axis and further being mounted within said power transmission body between said first and second opening, said second journal portion further being rotatably interconnected with said extending portion of said inner axle shaft extending through said first opening in said power transmission body such as to rotate about said central axis, and an intermediate portion disposed between said first and second journal portions fitted into said yoke means such that said yoke means prevents motion of said intermediate portion of said crank means relative thereto in the direction of said orbital movement while permitting longitudinal motion of said intermediate portion relative to said yoke means as well as permitting radial motion of said intermediate portion towards and away from said central axis; and
- means for mounting said first journal portion, second journal portion and said intermediate portion respectively to said housing inner axle shaft and power transmission body.

12. The power transmission device of claim 11 wherein said central passageway comprises a longitudinal bore through said power transmission body.

13. The power transmission device of claim 11 wherein each of said gear means comprises a conical gear.

14. The power transmission device of claim 11 further comprising a counterweight fixedly secured to said crank means such as to counterbalance said power transmission body as said power transmission body and said crank rotate about said central axis.

15. A power transmission device for converting reciprocating motion of a plurality of connecting rods each reciprocably disposed within a housing with its respective reciprocation axis parallel to a common central axis and spaced a predetermined distance from said central axis, said plurality of connecting rods reciprocating in a predetermined sequential order about said central axis, said power transmission device comprising:

- a power transmission body disposed adjacent to said plurality of connecting rods and pivotally interconnected with each of said plurality of connecting rods such as to wobble about said central axis as said plurality of connecting rods sequentially reciprocate;
- a central passageway through said power transmission body, said central passageway having a first portion defining a first opening and a second portion defining a second opening opposite said first opening;
- axle shaft means, said axle shaft means having a portion extending through said first opening in said power transmission body mounted to said housing about said central axis;
- interconnection drive means interposed said power transmission body and said axle shaft means for transmitting the kinetic energy of said wobbling motion of said power transmission body to rotational motion of said power transmission body,
- yoke means rotatably interconnected with said second portion of said power transmission body such that said yoke means moves in a circular orbital path about said central axis as said power transmission body is wobbled therebout;

crank means having a first end with a first journal portion rotatably mounted to said housing, said first journal portion having a central axis coaxial with said central axis of said power transmission device, a second end terminating in a second journal portion, said second journal portion having a central axis coaxial with said central axis and further being mounted within said power transmission body between said first and second opening, said second journal portion further being rotatably interconnected with said extending portion of said axle shaft means extending through said first opening in said power transmission body such as to rotate about said central axis, said intermediate portion disposed between said first and second journal portions and movably disposed within said yoke means such as to be movable relative thereto towards and away from said central axis and parallel to said central axis; and means for mounting said first journal portion, second journal portion and said intermediate portion respectively to said housing axle shaft means and power transmission body.

16. The power transmission device of claim 15 wherein said power transmission body comprises a unitary element having a hollow cylindrical main portion and a plurality of radial extensions extending from said main portion, each of said radial extensions being interconnected with one of said plurality of connecting rods.

17. The power transmission device of claim 16 wherein said axle shaft means comprises:

an inner axle shaft having a portion extending through said first opening in said power transmission body and interconnected with said second end of said crank means; and an outer axle shaft mounted coaxially with said inner axle shaft and constrained to move therewith.

18. The power transmission device of claim 17 wherein said central passageway comprises a longitudinal bore through said power transmission body.

19. The power transmission device of claim 17 wherein said interconnection drive means comprises:

first outer gear means fixedly disposed on an outer portion of said power transmission body;

second outer gear means interconnected with said axle shaft means, said second outer gear means engaging a portion of said first outer gear means such that said first outer gear means is rotated about said central axis as said power transmission body is wobbled therearound;

first inner gear means fixedly disposed within said first opening of said central passageway and said power transmission body; and second inner gear means disposed within said central passageway of said power transmission body adjacent said first inner gear means and interconnected with said extending portion of said axle shaft means, said second inner gear means engaging a portion of said first inner gear means diametrically opposed to the engaged portions of said first and second outer gear means such that said first inner gear means is rotated about said central axis as said power transmission body is wobbled therearound.

20. The power transmission device of claim 15 further comprising a counterweight fixedly secured to said crank means such as to counterbalance said power transmission body as said power transmission body and said crank rotate about said central axis.

21. A power transmission device for converting reciprocating motion of a plurality of connecting rods each reciprocably disposed within a housing with its respective reciprocation axis parallel to a common central axis and spaced a predetermined distance from said central axis, said plurality of connecting rods reciprocating in a predetermined sequential order about said central axis, said power transmission device comprising:

a power transmission body disposed adjacent to said plurality of connecting rods and pivotally interconnected with each of said plurality of connecting rods such as to wobble about said central axis as said plurality of connecting rods sequentially reciprocate;

a central cavity in said power transmission body, said central cavity having a first portion defining a first opening, said power transmission body further having a substantially square male journal end portion opposite said first opening;

axle shaft means mounted to said housing about said central axis, said axle shaft means having a portion extending through said first opening in said power transmission body;

first outer gear means fixedly disposed on an outer portion of said power transmission body;

second outer gear means interconnected with said axle shaft means, said second outer gear means engaging a portion of said first outer gear means such that said first outer gear means is rotated about said central axis as said power transmission body is wobbled therearound;

first inner gear means fixedly disposed within said first opening of said central cavity in said power transmission body;

second inner gear means disposed within said central cavity in said power transmission body adjacent said first inner gear means and interconnected with said extending portion of said axle shaft means, said second inner gear means engaging a portion of said first inner gear means diametrically opposed to the engaged portions of said first and second outer gear means such that said first inner gear means is rotated about said central axis as said power transmission body is wobbled therearound;

crank means having a first end portion comprising a first journal portion and a second journal portion adjacent said first journal portion; a second opposite end portion mounted to said journal end portion of said power transmission body; and an intermediate portion between said first end portion and said second opposite end portion, said first journal portion and second journal portion having an inner central axis coaxial with said central axis of said power transmission device; and said second opposite end portion of said crank means further having a three sided U-shaped female body defining an open end for mounting to said substantially square male journal end portion of said power transmission body; said second opposite end portion of said crank means being mounted to said journal end portion of said power transmission body with said open end facing in a predetermined direction substantially away from said central axis of said power transmission device such that the inertia forces at said journal end portion are not opposed by said crank means, whereby the instantaneous drive torque is translated by the two parallel sides of said three sided U-shaped female body and whereby further the radial components of the explosive force is received by said third side of said three sided U-shaped female body defining said second opposite end portion of said crank means.

22. A power transmission device for converting reciprocating motion of a plurality of connecting rods each reciprocably disposed within a housing with its respective reciprocation axis parallel to a common central axis and spaced a predetermined distance from said central axis, said plurality of connecting rods reciprocating in a predetermined sequential order about said central axis, said power transmission device comprising:
- a power transmission body disposed adjacent to said plurality of connecting rods and pivotally interconnected with each of said plurality of connecting rods such as to wobble about said central axis as said plurality of connecting rods sequentially reciprocate;
- a central passageway through said power transmission body, said central passageway having a first portion defining a first opening and a second portion defining a second opening opposite said first opening, said second opening defining a substantially rectangular female journal bushing;
- axle shaft means mounted to said housing about said central axis, said axle shaft means having a portion extending through said first opening in said power transmission body;
- first outer gear means fixedly disposed on an outer portion of said power transmission body;
- second outer gear means interconnected with said axle shaft means, said second outer gear means engaging a portion of said first outer gear means such that said first outer gear means is rotated about said central axis as said power transmission body is wobbled therearound;
- first inner gear means fixedly disposed within said first opening of said central passageway and said power transmission body;
- second inner gear means disposed within said central passageway of said power transmission body adjacent said first inner gear means and interconnected with said extending portion of said axle shaft means, said second inner gear means engaging a portion of said first inner gear means diametrically opposed to the engaged portions of said first and second outer gear means such that said first inner gear means is rotated about said central axis as said power transmission body is wobbled therearound;
- crank means having a first end portion comprising a first journal portion and a second journal portion adjacent said first journal portion; a second opposite end portion mounted within said second opening of said central passageway, said first journal portion and said second journal portion having a common central axis coaxial with said central axis of said power transmission device; and
- said second opposite end portion of said crank means further having a substantially square male body for mounting in said substantially rectangular female journal bushing of said second opening of said power transmission body; said substantially rectangular female journal bushing being mounted in said second opening of said power transmission body with the longest sides being substantially perpendicular to said central axis such that the inertia forces at said substantially rectangular female journal bushing are not opposed by said crank means, whereby the instantaneous drive torque is translated by said longest sides of said substantially rectangular female bushing and whereby further the radial components of the explosive force is received by said shortest sides of said substantially rectangular female journal bushing of said second opening of said crank means.

* * * * *

UNITED STATES PATENT AND TRADEMARK OFFICE
CERTIFICATE OF CORRECTION

PATENT NO. : 4,565,103

DATED : January 21, 1986

INVENTOR(S) : Maurice Brille

It is certified that error appears in the above-identified patent and that said Letters Patent is hereby corrected as shown below:

Column 1, line 24, delete "This" and insert ---- That ----. Same line, after "is" insert a comma ---- , ----.

Column 1, line 35, delete "angle" and insert ---- axle ----.

Column 2, line 6, after "that" insert ---- several problems are still existing firstly, ----.

Column 2, line 24, after "cross-sectional" insert ---- view ----.

Column 2, line 60, after "is" insert ---- a ----.

Column 2, line 64, delete "black" and insert ---- block ----.

Column 3, line 7, after "mobile" insert ---- inner rolling ----.

Column 3, line 42, delete "axle" and insert ---- shaft ----.

UNITED STATES PATENT AND TRADEMARK OFFICE
CERTIFICATE OF CORRECTION

PATENT NO. : 4,565,103
DATED : January 21, 1986
INVENTOR(S) : Maurice Brille

It is certified that error appears in the above-identified patent and that said Letters Patent is hereby corrected as shown below:

Column 3, line 66, delete "had" and insert ---- has ----.

Column 4, line 4, delete "unfavourable" and insert ---- unfavorable ----.

Column 4, line 8, after "the" second insert ---- axle ----.

Column 4, line 14, delete "unexpected result has been found that," and insert ---- unexpectantly ----.

Column 4, line 28, delete "18; the" and insert ---- 18. The ----.

Column 4, line 40, delete "seat" and insert ---- seat 5 ----.

Column 5, line 1, after "the" first occurrence insert ---- thrust ----.

UNITED STATES PATENT AND TRADEMARK OFFICE
CERTIFICATE OF CORRECTION

PATENT NO. : 4,565,103

DATED : January 21, 1986

INVENTOR(S) : Maurice Brille

It is certified that error appears in the above-identified patent and that said Letters Patent is hereby corrected as shown below:

Column 5, line 8, delete "74" and insert ---- 78 ----.

Column 5, line 13, after "should" insert ---- be ----.

Column 5, line 49, delete "reduce" and insert ---- induce ----.

Column 6, line 26, delete " - M' = - cL - cL or - L(c+d)" and insert ---- - M' = - cL - dL or - L(c+d) ----.

Column 6, line 34, delete "b1 = d1 = 0" and insert ---- b1 - d1 = 0 ----.

In the Claims

Column 10, line 24, after "housing" insert a comma ---- , ----.

Same line, after "shaft" insert a comma ---- , ----.

UNITED STATES PATENT AND TRADEMARK OFFICE
CERTIFICATE OF CORRECTION

PATENT NO. : 4,565,103
DATED : January 21, 1986
INVENTOR(S) : Maurice Brille

It is certified that error appears in the above-identified patent and that said Letters Patent is hereby corrected as shown below:

Column 10, delete lines 57 through 60 in its entirety and insert ---- axle shaft means mounted to said housing about said central axis, said axle shaft means having a portion extending through said first opening in said power transmission body; ----.

Column 10, line 65, delete "," and insert ---- ; ----.

Column 11, line 24, after "housing" insert a comma ---- , ----. Same line, after "means" insert a comma ---- , ----.

Signed and Sealed this

Twenty-ninth Day of July 1986

[SEAL]

Attest:

DONALD J. QUIGG

Attesting Officer

Commissioner of Patents and Trademarks